April 16, 1963 — H. V. KINDSETH — 3,085,292

METHOD OF PRODUCING OPEN MESH SHEETING OF THERMOPLASTIC RESIN

Filed Feb. 13, 1959

INVENTOR.
HAROLD V. KINDSETH
BY
*Merchant & Merchant*
ATTORNEYS

United States Patent Office 3,085,292
Patented Apr. 16, 1963

3,085,292
METHOD OF PRODUCING OPEN MESH SHEETING OF THERMOPLASTIC RESIN
Harold V. Kindseth, % Bemis Bros. Bag Co., Pillsbury Bldg., 608 2nd Ave. S., Minneapolis 2, Minn.
Filed Feb. 13, 1959, Ser. No. 793,158
3 Claims. (Cl. 18—55)

My invention relates to open mesh plastic sheeting and to a method for producing the same in continuous running lengths.

Broadly stated, the method herein disclosed consists of continuously forming a mass of resinous plastic material into an open mesh sheet or net, by molding means such as one or more grooved rolls or the like, hardening the molded plastic material in the grooves of the mold means, and removing the continuous running length of the plastic open mesh sheet or net thus produced from the mold. The open mesh material thus produced is adapted to be converted directly into various articles, or can be wound into rolls or cut into sheets and stored for further use. The material may be used for containers such as bags for transporting fruits and vegetables, and is particularly valuable in such use where the goods to be packaged require good ventilation, or where it is desired that the goods be clearly visible. Depending upon the plastic material involved, the weight of material used, and the coarseness or fineness of mesh, the mesh sheeting may be used for screens, grills, fish nets, and for most other purposes otherwise utilizing woven material.

An important object of my invention is the provision of a method for producing open mesh sheet material between a pair of rollers in which one of said rollers as discrete zones or areas maintained in radial face-to-face engagement with the other of said rollers which permits said material to be produced with a wide variety of mesh design.

Another object of my invention is to provide a method for continuously producing open mesh sheet material wherein a fluid plastic mass is molded into a pattern of connecting filaments, portions of the mass making up the filament material on all sides of any given filament intersection.

Still another object of my invention is the provision of a method for producing plastic net sheeting at relatively low cost and at relatively high speed, and in which no scrap material results.

Another object of my invention is the provision of a method for producing running lengths of plastic net or open mesh sheeting which includes a selvage portion or a non-perforated area to provide printing or labeling surfaces.

Another object of my invention is the provision of a method for producing running lengths of plastic net sheeting, which method includes the complete removal of any flashing which may form in the openings between the filaments.

The above and still further highly important objects and advantages of my invention will become apparent from the following detailed specification, appended claims and attached drawings.

Referring to the drawings in which like reference characters indicate like parts throughout the several views.

Figure 1:
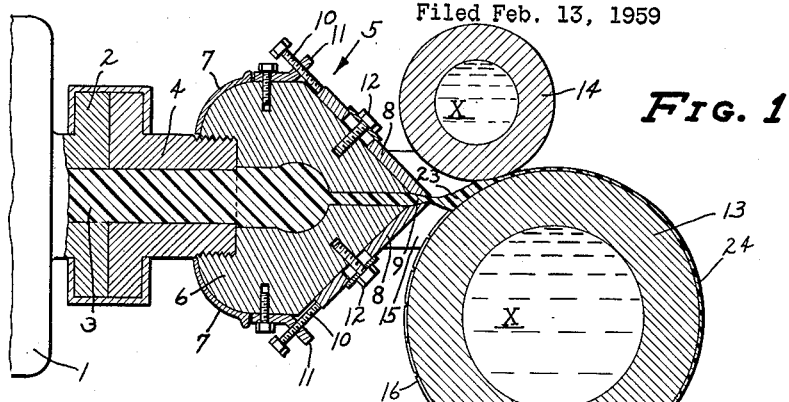
FIG. 1 is a vertical section of one form of apparatus for producing running lengths of plastic net sheeting in accordance with my invention.

Referring with greater detail to the drawings, and more particularly to FIG. 1, a conventional extruder, indicated at 1, is shown as being provided with a discharge head 2 defining a discharge opening 3, and to which is suitably coupled a tubular adapter 4. The adapter 4 is screw threaded into, or otherwise rigidly secured to, a sheeting die 5 comprising, a main body 6, a pair of conventional heating elements 7, and a pair of adjustable sizing bars or plates 8. The adjacent edges of the sizing bars 8 define a discharge opening 9 for the sheeting die 5, adjustment thereof being effected by adjustment screws 10 which are screw threaded in brackets 11 secured to the body 6 of the sheeting die 5, the sizing bars 8 being releasably locked in adjusted positions by retainer bolts 12.

A pair of rotary cylindrical mold elements or rolls 13 and 14 are disposed laterally outwardly of the sheeting die 5 on parallel axes, said rolls 13 and 14 being maintained in tangential abutting face-to-face relationship by suitable means, not shown. It will be noted that the body 6 of the sheeting die 5 is so shaped that the sizing plates or bars 8 converge toward the discharge opening at substantially right angles to each other, the cylindrical mold rolls 13 and 14 being positioned relative to said discharge opening 9 that the opening 9 is in closely spaced relation to the nip between the rolls 13 and 14. Preferably, the sheeting die 5 and the mold rolls 13 and 14 are co-extensive in length, and edge dams 15, one of which is shown, are disposed at opposite ends of the sheeting die and mold rolls to confine plastic material therebetween. Preferably, the mold rolls 13 and 14 are hollow for the reception of cooling fluid such as water, steam, or the like whereby the temperature of the mold rolls 13 and 14 may be controlled within close limits.

Figures 4, 5:
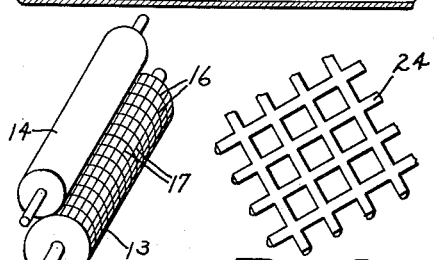
FIG. 4 is a view in perspective of a pair of cooperating cylindrical molds utilized in the apparatus of FIG. 1, but shown on a reduced scale.
FIG. 5 is an enlarged fragmentary view in perspective of open mesh sheet material produced by the molds of FIGS. 1 and 4.

With reference to FIG. 4, it will be seen that the outer cylindrical surface of the roll 13 is formed to provide axially spaced circumferential channels or grooves 16 and circumferentially spaced axially extending grooves or channels 17 which intersect the channels 16 and cooperate therewith to define a reticular cavity. It will be further noted that the exterior cylindrical surface of the roll 14 is smooth and unbroken, this surface being in face-to-face contact with discrete surface portions of the roll 13 between the channels or grooves 16 and 17.

The apparatus of FIG. 1 further includes a pair of take-off rolls 18 and 19, the former of which is disposed adjacent the mold roll 13 in circumferentially spaced parallel relationship to the mold roll 14, the take-off roll 19 being disposed in underlying parallel reationship to the roll 18. A pair of cooperating guide rolls 20 and 21 are positioned in laterally spaced parallel relation to the take-off rolls 18 and 19, and are disposed in superimposed parallel relationship. Heating means in the nature of a conventional gas burner 22 is positioned between the lower take-off roll 19 and the lower feed or guide roll 21 for a purpose which will hereinafter be described.

In carrying out my novel method, plastic material in a molten state is forced into the interior of the die 5 by the extruder 1, the material being discharged outwardly through the elongated discharge openings 9 toward the nip of the cylindrical molds or rolls 13 and 14. The rolls 13 and 14 are caused to rotate, the former in a clockwise direction and the latter in a counterclockwise direction, with respect to FIG. 1, and at rates of speed corresponding substantially with the rate of discharge of the plastic material from the sheeting die 5. As the molten plastic material enters the nip between the rolls 13 and 14, the material between the discrete zones or areas on one roller which are maintained in face-to-face engagement with the cooperating face of the other roller, is forced into the channels 16 and 17 of the roll 13 between said discrete zones or areas. As the rolls 13 and 14 rotate, the plastic material hardens within the grooves 16 and 17, the rate of cooling and hardening of the material being determined by the temperature at which the rolls 13 and 14 are maintained by the cooling medium therewith, said cooling medium being indicated by the reference character X. Upon reaching the upper take-off roll 18, the molded plastic sheet material has cooled and hardened sufficiently to maintain its molded shape, and the same is fed between the take-off rolls 18 and 19 toward and between the guide rolls 20 and 21. From thence, the material is wound into rolls, cut into sheets of predetermined lengths and stacked, or other desired disposition made thereof.

Plastic materials best suited for use in producing open mesh sheeting by my novel method, are the thermoplastic resins such as polyethylene, vinyl plastics, nylon, and the like. These materials melt at points somewhat above the boiling point of water, and in instances where the molten material, indicated at 23 in FIG. 1, hardens at a relatively high temperature, steam is used as a cooling agent within the rolls 13 and 14. Whatever the material 23 may be, it is preferably cooled to approximately room temperature as it moves between the take-off rolls 18 and 19 and toward the guide rolls 20 and 21, the molded mesh sheet being indicated at 24.

In the molding of open mesh plastic sheeting as above described, very thin membranes of material, or flash, occurs between the filaments comprising the molded material. As the material 24 passes over the burner 22, heat from the burner 22 causes the flash to melt into the main body portions of the filaments, the heat from the burner and speed of movement of the material 24 being regulated so that the filaments themselves do not melt sufficiently to cause the material to lose its shape or strength. Obviously, before the material 24 is rolled or otherwise disposed of, the same is again brought to room temperature.

When the apparatus is to be run for the first time the retainer bolts 12 and adjustment screws 10 are loosened and the desired clearance between the adjacent edges of the sizing bars 8 is established and the bolts 12 are tightened. Under different operating conditions and when using different thermo-plastics the clearance between adjacent edges of the sizing bars 8 may be changed, as desired. Generally when a heavy thick net is to be made, or operating speeds are to be increased, the clearance should be greater. These and other considerations in making adjustments in the clearance between the sizing bars 8 will be apparent to those skilled in the art. In the preferred die construction for thermoplastic resins, the faces of the die to which the sizing bars 8 are attached, lie in planes which intersect one another at an angle of about 90° so that the lips of the die may be introduced well into the nip between the forming rolls 13 and 14. This provision allows for a closer control over the temperature of the melt when it reaches the nip. In some instances the best forming temperature or molding temperature is the same as the extrusion temperature in which case the die lips should be close enough to the nip so that a minimum amount of heat is lost from the molten plastic. In other instances, the best molding temperature for the resin may be somewhat below the extrusion temperature in which case the die may be drawn back from the nip and the extruded sheet allowed to cool slightly before passing into the nip. In any case, by using a die having a protruding extrusion orifice it is possible to introduce the orifice well between the rolls 13 and 14 if this becomes necessary. Generally, materials which have sharp melting points, such as polyamids, will harden if allowed to cool slightly so that the die lips should be close to the nip, while plastics with a broad softening range such as polyethylene may be still formable at temperature somewhat below the extrusion temperature. In the latter instance, the quenching of the plastic when it comes into contact with the relatively cool rolls may not be sufficient to set the plastic immediately so that the resin may be allowed to cool before it passed into the nip and is pressed into the grooves 15 of roll 14, whereby it will retain the shape of the grooves.

Where the formable plastic mass passes into the grooves between rolls 13 and 14 there may be a slight accumulation or widening in the mass. This accumulation should not be allowed to become too great because then the temperature of the resin, as it enters between the rolls, cannot be kept accurately controlled. Furthermore, since the rolls are relatively cool, an accumulation of material at the nip where it contacts the rolls and may tend to form a thin film on the surface of the rolls, which is, of course, undesirable.

In forming polyethylene resin, roll 14 may be maintained at about 280–350° F. and roll 13 at about 150–200° F. The rolls 13 and 14 are then caused to rotate in given feeding directions. Roll 14 is then pressed tightly against roll 13. At this time the rolls may be coated with a spray application of a suitable release agent such as silicone oil or silicone resin. After the extruder 1 and sheeting die 5 have reached the appropriate temperature, the extruder 1 is started and the extrudate is fed into the nip of rolls 13 and 14. When the leading edge of the net 24 has traveled around roll 13 as far as roll 18, it is peeled off the surface of roll 13 manually and fed between rolls 18 and 19 and then between rolls 20 and 21. Before the heater is brought into position, the following step is taken to minimize flash. The speed of the rolls is adjusted to regulate the size of the bank of material 23 formed in the nip of the rolls. If the bank is fairly large, the speed of the rolls is increased slightly. It should be noted that the amount of flashing will in general be reduced if the resin is prevented from forming a large bank at the nip of rolls 14 and 13. The net may conveniently be examined even if traveling at a fairly high speed by the use of a strobe light, not shown. After this adjustment is made, the flash will be minimized and the strands will be completely formed. At this time the heater 22 may be turned on and the flame adjusted to melt down the flash without melting the strands.

Figure 2:
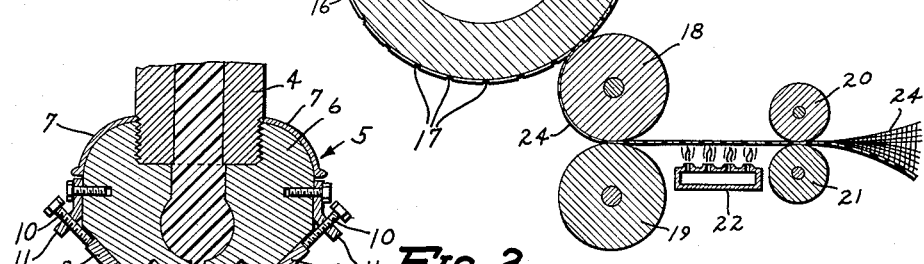
FIG. 2 is a vertical section showing a modified form of apparatus for producing plastic net sheeting in accordance with my invention.

A modified structure for carrying out my novel method is illustrated in FIGURE 2, wherein the molten plastic material 23 is discharged downwardly to the nip of a pair of cooperating cylindrical mold rolls 13' and 14' which, except for differences in diameter, are identical to the mold rolls 13 and 14 of FIGS. 1 and 4. The sheeting die which feeds the molten material 23 to the mold rolls 13' and 14' is identical to the sheeting die 5 of FIG. 1 and, with the several component parts thereof, carries the same reference characters as those of FIG. 1. The rolls 13' and 14' are shown as being partially submerged in cooling liquid, preferably water, in a suitable tank or container 25, and are rotated in opposite directions as indicated by arrows. A pair of brushes or the like 26 are utilized to wipe off excess cooling liquid from the surfaces of the rolls 13' and 14', and a pair of cooperating take-off or guide rolls 27 are journalled adjacent the bottom of the tank 25 in parallel relation to the rolls 13' and 14', for the purpose of guiding the molded material 24 through the cooling liquid in the tank 25. As the open mesh sheet material 24 leaves the guide rolls 27, it passes angularly upwardly through the cooling liquid and over a third guide roll 28 for further treatment, preferably by a burner, not shown, but which may assume to be equivalent to the burner 22, for the purpose of removing any flash which may occur, as described above with respect to the apparatus of FIG. 1. Inasmuch as the brushes 26 do not remove all of the moisture from the outer surfaces of the mold rolls 13' and 14', a relatively small amount of the liquid is carried around toward the nip between said rolls through which the material 23 is being discharged. Upon coming into contact with the molten material 23, the liquid vaporizes, tending to cool the molten material 23 as it is pressed into the mold cavities of the roll 13' while forming an extremely thin vapor barrier between the material and the rolls 13' and 14'. This vapor barrier effectively prevents the hardening plastic material from adhering to the rolls 13' and 14', and the cooling effect thereof and the liquid immediately below the nip hardens the molded material 24 to an extent that the same may be removed from the mold cavities immediately upon leaving the nip between said mold rolls 13' and 14'.

Figure 3:
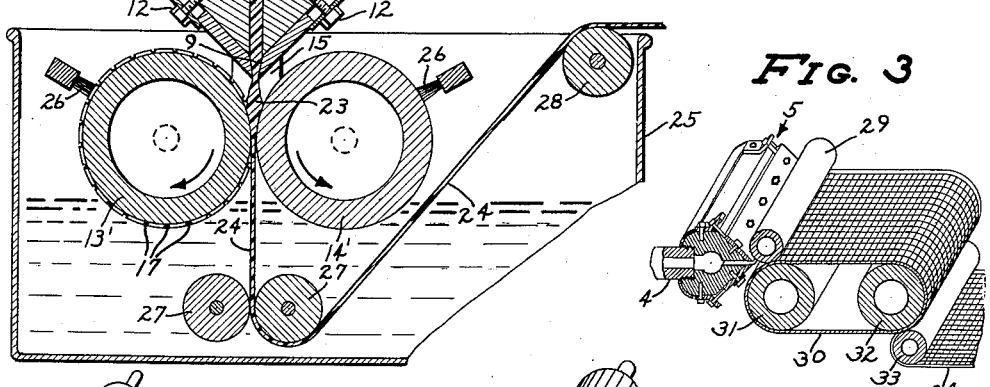
FIG. 3 is a view, partly in vertical section and partly in perspective, on a reduced scale showing another modification of the apparatus of FIG. 1.

In the modified form of the apparatus illustrated in FIG. 3, the sheeting die 5 feeds the molten material between a smooth cylindrical mold roll 29 and a cooperating endless belt 30 which is entrained over a pair of spaced supporting rolls 31 and 32, the former of which underlies the mold roll 29. The endless flexible belt 30 is provided with longitudinally and transversely extending grooves or channels similar to the grooves or channels 16 and 17 in the mold roll 13. The molten plastic material is forced into these grooves by the smooth roll 29, and hardens as the belt 30 moves from the roll 31 to the roll 32, at which point the molded open mesh sheet material 24 is removed from the belt 30, the sheet 24 being guided around a take-off roll 33. Preferably, the roll 31 is maintained at a temperature at or above the extruding temperature of the resin, whereas the roll 32 is maintained at a considerably cooler temperature, so that the formed net is cooled to the desired temperature before being removed from the belt 30.

Figures 6, 7:
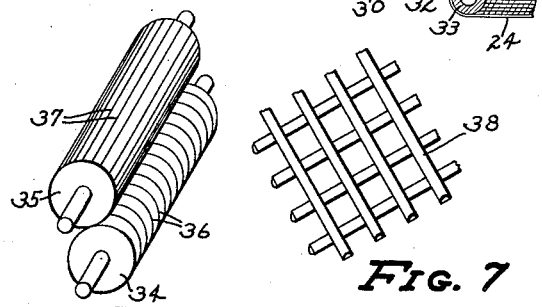
FIG. 6 is a view corresponding to FIG. 4 but showing a modified form of mold construction.
FIG. 7 is a view corresponding to FIG. 5, but showing material produced by the molds of FIG. 6.

The modified form of cylindrical mold structure illustrated in FIG. 6, involves mold rolls 34 and 35, the former of which is provided with axially spaced circumferentially extending molding grooves or channels 36, and the latter of which is provided with circumferentially spaced axially extending grooves or channels 37, the rolls 34 and 35 cooperating to produce open mesh sheeting of the type illustrated fragmentarily in FIG. 7 and indicated by the numeral 38. With reference to FIGS. 5 and 7, it will be noted that the filaments making up the net or open mesh sheeting 24 and 38 respectively are half round in cross section. However, it will be understood that the filaments may be of any desired cross sectional shape, this shape being determined by the shape of the grooves of the various cylindrical molds, it being required only that the molded sheeting be easily removed from the molds in a continuous manner.

Figure 8:
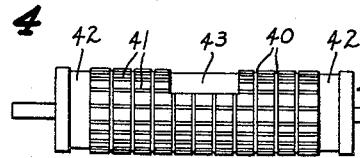
FIG. 8 is a view in side elevation of a further modified form of cylindrical mold.

The modified form of cylindrical mold shown in FIG. 8 and indicated generally at 39, is adapted to be used in cooperation with a smooth roll, such as the roll 14, and cooperates therewith to provide open mesh sheeting having continuous imperforate bands at opposite side edges thereof and longitudinally spaced imperforate areas, the longitudinally extending imperforate edge portions being in the nature of selvages. To produce this type of open mesh sheeting, the mold roll 39 is provided with axially spaced circumferentially extending grooves or channels 40, circumferentially spaced axially extending grooves 41, a pair of relatively wide circumferentially extending channels 42 adjacent the opposite ends thereof, and one or more generally rectangular radially outwardly opening recesses 43. Obviously, the recesses 43 may be of any desired shape, the imperforate selvages and spaced portions of the material formed by the channels 42 and recesses 43 being adapted to receive printed matter or the like.

My invention is primarily concerned with the forming of netting or open mesh sheeting from thermoplastics; however, it will be appreciated that the instant method is capable of forming such sheeting from thermo setting resins, plastisols, and various other materials which can be molded. While I have shown and described a preferred method for producing open mesh sheeting, and several types of apparatus for carrying out the method, it will be understood that the same is capable of modification without departure from the spirit and scope of the invention, as defined in the claims.

What I claim is:

1. The method of manufacturing running lengths of plastic resinous open mesh sheet or net comprising the steps of, heating a supply of plastic resinous material to a molten state, continuously feeding the molten material in a homogeneous sheet form, controlling the plasticity of said sheet feeding into the nip of a pair of cooled cooperating endless rotary die elements whereby progressive cooling and hardening of said plastic sheet begins at said nip, said elements having spaced discrete areas in face-to-face pressing engagement and at least one of which die elements being provided with grooves on the surface thereof between said areas, continuously cooling and hardening said plastic sheet material while rotating said plastic material pressing and displacing die elements in said face-to-face engagement thereby forcing substantially all of said material from said areas into the grooves and compressing the material in the grooves, maintaining said die elements below the melting temperature of said plastic sheet material throughout their circumferential extent during the steps of forcing and pressing thereof into said grooves, and thereafter continuously withdrawing the formed open mesh sheet or net from said grooves.

2. The method as defined in claim 1, with further cooling the formed open mesh sheet or net to approximately room temperature and thereafter continuously running the formed open mesh sheet or net adjacent a source of heat above the melting temperature of the plastic material thereof and at a speed which will expose same to said heat for a period of time to remove any flashing without damage to the formed open mesh sheet or net produced.

3. The method of manufacturing running lengths of plastic resinous open mesh sheet or net comprising the steps of, heating a supply of plastic resinous material to a molten state, continuously extruding the molten material in homogeneous sheet form of substantially uniform thickness, controlling the temperature and plasticity of said sheet passing into the nip of a pair of relatively cooler rollers, continuously cooling the peripheries of the rollers throughout their contact with said plastic sheet to progressively harden said plastic material, at least one of said rollers being provided with grooves on the surface thereof forming discrete areas on the surface completely surrounded by the grooves, the two rollers of said pair of rollers being in positive face-to-face pressure engagement through said plastic sheet material at said discrete areas, said sheet being substantially coextensive with the length of the rollers, continuously rotating said rollers in said face-to-face engagement to move the sheet and squeeze and force substantially all of the material of the sheet from said areas into the surrounding grooves and to compress the material forced into the grooves, whereby all of the cooling sheeted material is simultaneously and progressively distributed and thus congealed during the forcing and compressing thereof in the grooves and thereafter continuously removing the resultant cooled open mesh sheet from said groove between contacting cooled rollers.

References Cited in the file of this patent

UNITED STATES PATENTS

| | | |
|---|---|---|
| 825,977 | Neville | July 17, 1906 |
| 1,339,789 | Rothwell et al. | May 11, 1920 |
| 2,218,227 | Winnek | Oct. 25, 1940 |
| 2,514,213 | Mason et al. | July 4, 1950 |
| 2,567,704 | Grimes | Sept. 11, 1951 |
| 2,582,294 | Stober | Jan. 15, 1952 |
| 2,957,200 | Pufahl et al. | Oct. 25, 1960 |

FOREIGN PATENTS

| | | |
|---|---|---|
| 484,929 | Great Britain | May 12, 1938 |
| 128,824 | Australia | Aug. 19, 1948 |
| 134,532 | Australia | Oct. 6, 1949 |
| 507,305 | Belgium | Dec. 15, 1951 |